Aug. 20, 1929.  O. D. H. BENTLEY  1,724,902
BEARING
Filed Feb. 27, 1924

Witness:
Alfred H. McGlinchey.

Inventor:
Oliver D. H. Bentley
by his attorneys
Van Ernen Irish Hildreth Hay

Patented Aug. 20, 1929.

1,724,902

UNITED STATES PATENT OFFICE.

OLIVER D. H. BENTLEY, OF NORFOLK, MASSACHUSETTS, ASSIGNOR TO B. F. STURTEVANT COMPANY, OF HYDE PARK, MASSACHUSETTS, A CORPORATION OF MASSACHUSETTS.

BEARING.

Application filed February 27, 1924. Serial No. 695,452.

The present invention relates to bearings and more particularly to anti-friction bearings of the ball and roller types, and to systems for lubricating the same.

A common method of lubricating a ball bearing is to provide in the bearing casing a body of oil through which the balls rotate. For the best results only a small quantity of oil should be supplied to the bearing, but in order to insure operation for long periods without replenishment or attention it is the usual practice to provide a large excess of oil with a consequent flooding of the bearing.

It is the object of the present invention to provide a bearing of the described type in which the casing may be supplied with oil at a level well above the bearing surfaces, only a sufficient amount of oil, however, being admitted to the balls and races to provide for proper lubrication, all possibility of flooding being avoided. In its preferred form the bearing has a barrier or guard plate between the balls and the oil supply to prevent an excess of oil from reaching the bearing surfaces, and suitable openings are formed in the barrier to admit only the correct amount of oil to the balls and races, other openings permitting the return to the oil supply of the oil delivered to the bearings so that the correct quantity of oil for proper lubrication is continuously circulated between the casing and the bearing surfaces.

Figure 1:
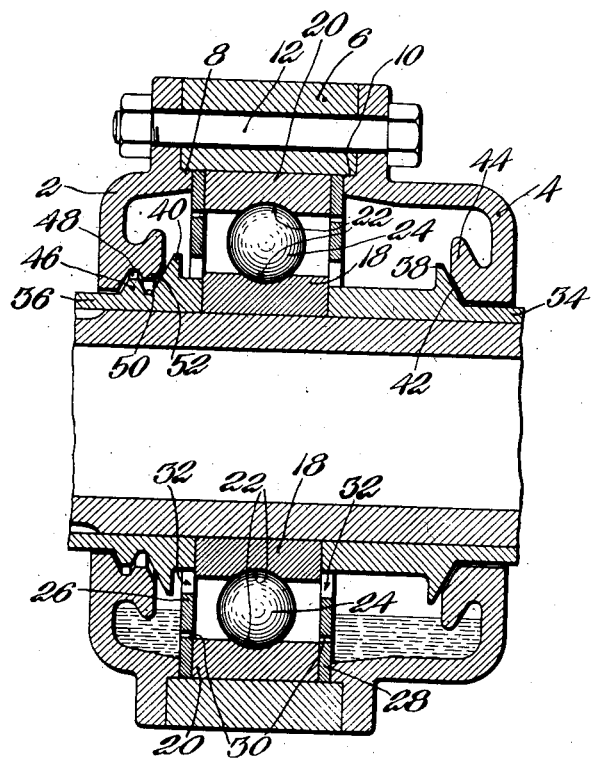
Figure 2:
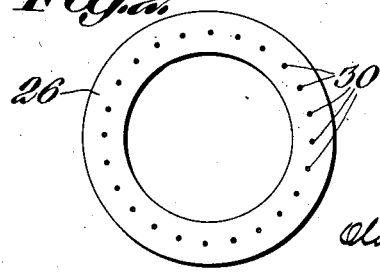

In the accompanying drawing, Fig. 1 is a longitudinal vertical sectional elevation of the preferred form of bearing, and Fig. 2 is an elevation of one of the guard plates on a reduced scale.

The illustrated embodiment of the invention comprises a bearing casing consisting of end sections 2 and 4 and an annular closure 6 resting upon flanges 8 and 10 of the end members, the three portions being retained together by a series of through bolts 12 arranged at intervals around the casing. The casing may be supported upon a suitable pedestal or on a bracket from stationary parts of the machinery in any convenient manner.

A movable ball race 18 is secured to the shaft and a stationary ball race 20 is fitted in the casing closure 6, the races being provided with the usual annular grooves 22 within which the balls 24 roll. The lower portion of the casing is filled with oil to the level indicated in the drawing which is well above the lowest part of the bearing surface of the stationary race, and to prevent flooding of the bearing there are provided two guard plates or rings 26 and 28 between the stationary ball race and the oil supply. The guard plate 26 is clamped between the flange 8 and the ball race, while the plate 28 is clamped between the flange 10 and the ball race. Each guard plate is provided with a circular series of openings 30 arranged immediately adjacent the inner peripheral face of the stationary ball race 20 of a size to permit only a slight flow of oil to the bearing surfaces. The oil, upon entering, serves to lubricate the bearing surfaces between the lowermost balls and the stationary ball race and upon rotation of the shaft the remaining balls are brought successively into position for lubrication, while the rotation of the balls carries sufficient oil to lubricate the movable ball race 18.

It will be observed that inasmuch as the oil is fed only to the balls which are occupying the lowermost position, the purposes of the invention would be carried out by using guard plates which extend only over a fraction of the circumference in the bottom portion of the casing, but it is preferred to use annular guard plates extending completely around the casing in order that the bearing may be assembled and used without requiring any particular positioning of the guard plates or of the bearing.

The rotation of the balls and their travel in the races discharges the oil from these parts laterally in opposite directions, and in order to facilitate the return of this oil to the supply in the casing, the guard plates are made with an internal diameter sufficiently greater than the diameter of the movable ball race to provide annular openings 32 adjacent to the movable ball race 18 through which the oil may pass. These annular openings 32, together with the smaller openings 30, which are above the oil level and therefore take no part in the delivery of oil from the supply to the bearing, provide a relatively large total area to insure the free and quick return of the oil and thereby prevent any accumulation thereof and consequent flooding of the bearing.

Secured to the shaft are two oil deflectors 34 and 36, one on each side of the movable ball race 18. The deflector 34 has an annular flange 38 and the deflector 36 has a similar flange 40. More or less of the oil thrown from the bearings impinges on the deflectors and travels along their surfaces until it strikes the flanges 38 and 40 from which it is thrown off by centrifugal force against the walls of the casing, thereafter dripping back into the oil supply. The flange 38 is provided with an inclined annular surface 42 cooperating with a similar surface on a guard 44 formed on the casing portion 4 to prevent or retard the escape of oil. The deflector 40 is similar in construction, being formed with an annular ridge 46 opposite a recess 48 in the casing portion 2 and with a recess 50 within which is received a projection 52 of the casing, the external diameter of the ridge 46 being slightly less than the internal diameter of the projection 52 to permit assembling of the casing parts over the shaft.

It will be observed that in operation only a sufficient amount of oil will be admitted through the lowermost openings 30 to insure proper lubrication. Such oil is then returned through the openings 32 and the openings 30 located above the oil level in the manner above described, and is directed back into the casing by the oil deflectors so that a continuous circulation of the proper amount of oil is insured for long periods of operation without flooding of the moving parts or the necessity of frequent inspection or replenishment. While this oil, of course, will seek a level when the shaft is not rotating, and will then flood the bearing, immediately upon starting rotation the oil will be reduced in the bearing to the proper amount.

While in the drawings I have shown, and in the specification I have described, what is now considered the preferred form of the present invention, it is to be understood that the invention is not limited thereto except where so specifically defined in the claims, but may be embodied in other forms and proportions. Furthermore, where in the claims I have used such terms as "ball bearing", "balls", and "ball races", it is to be understood that these are intended to include roller bearings, cages, races, and other corresponding parts of similar anti-friction bearings.

Having thus described the invention, what is claimed is:

1. A ball bearing having, in combination, two ball races, balls movable between the races, a stationary casing adapted to contain a supply of oil at the side of the bearing, and a stationary guard member transverse to the axis of the bearing between the bearing and the oil supply constructed and arranged to permit the axial delivery by gravity of oil in restricted amounts to the bearing, and the free axial return of such oil to the supply.

2. A ball bearing having, in combination, ball races, balls movable between the races, an annular oil supply chamber at the side of the bearing adapted to contain a supply of oil at a level above the engaging surfaces of the balls with one of the races, and a fixed guard member transverse to the axis of the bearing and between the balls and the oil supply chamber, the guard member having a restricted opening for presenting by gravity a small amount of oil continuously to the bearing surfaces and providing free communication between the bearing and the chamber above the oil level to permit oil to be continuously returned in an axial direction from the bearing to the oil supply chamber.

3. A circumferential ball bearing having, in combination, ball races, balls movable between the races, a casing adapted to contain a supply of oil at a level above the engaging surfaces of the balls with one of the races, and a fixed guard member between the balls and the oil supply to prevent flooding of the bearing surfaces, the guard member having restricted openings below the oil level for permitting a small continuous gravity feed of oil to the bearing surfaces and enlarged openings above the oil level for permitting a continuous return of oil axially of the circumferential ball races from the bearing to the supply.

4. A ball bearing having, in combination, ball races, balls movable between the races, a stationary casing at the side of the bearing adapted to contain a supply of oil at a level above one of the races, and a flat annular guard plate fixed between the ball races and the oil supply to form a barrier extending above the surface of the oil and having a circular series of restricted axial openings at least one of which is positioned beneath the oil level to permit a small continuous gravity feed of oil to the bearing surfaces.

5. A ball bearing having, in combination, a shaft, a rotatable ball race secured to the shaft, a stationary ball race, balls between the races, a casing adapted to contain a supply of oil on each side of the bearing, an annular guard plate secured on each side of the stationary ball race having openings adjacent to the race for admitting a small flow of oil to the bearing surfaces, the inner diameter of the guard plates being such as to provide annular openings through which oil may be thrown from the balls and races, and an oil deflector secured to the shaft on each side of the ball race, each deflector having a flange for throwing the oil back into the supply by centrifugal force.

6. A ball bearing having, in combination, a shaft, a rotatable ball race secured to the shaft, a stationary ball race, balls between the races, a casing adapted to contain a supply of oil on each side of the bearing, and an annular guard plate secured on each side of the stationary ball race having openings adjacent to the race for admitting a small flow of oil to the bearing surfaces, the inner diameter of the guard plates being such as to provide annular openings through which oil may be thrown from the balls and races.

7. A ball bearing for a horizontal shaft having, in combination, ball races, balls movable between the races, a casing at the side of the bearing adapted to contain a supply of oil, and a flat annular guard plate arranged transversely of the axis of the shaft and fixed between the ball races and the oil supply to form a barrier extending above the oil level, the guard plate having a restricted opening below the oil level to permit a small continuous gravity feed of oil to the bearing surfaces and formed to provide communication between the oil supply and the ball races above the oil level to permit an axial return of oil from the balls to the supply.

8. The combination with a rotating shaft of a ball bearing for supporting the same comprising a fixed casing formed to contain a supply of oil, a stationary annular ball race mounted in the casing, a rotary annular ball race carried by the shaft and located within the stationary race, balls between the inner peripheral face of the stationary race and the outer peripheral face of the rotary race, and a stationary guard member at the side of the stationary race extending above the level of the oil supply and having a passage below the oil level to permit a small continuous gravity feed of oil to the inner peripheral face of the stationary race and being constructed to provide an opening above the oil level for the escape of oil axially of the bearing.

9. The combination with a rotating shaft of a ball bearing for supporting the same comprising a pair of annular ball races concentrically disposed and spaced apart one within the other, balls between the races, a casing at the side of the bearing to contain a supply of oil, and a guard plate transverse to the shaft and located between the bearing and the oil supply and forming a barrier extending above the oil level, the plate having a restricted opening below the oil level to permit a small continuous gravity feed of oil to the space between the inner and outer ball races, the plate being formed to provide a passage at the side of the bearing above the oil level to permit the escape of oil from the bearing axially of the shaft and its return to the oil supply.

10. The combination with a rotating shaft of a ball bearing for the same comprising a sectional casing having provision for containing a supply of oil in the bottom portion thereof, a stationary annular ball race, clamping means for securing the parts of the casing and the stationary race in fixed relation, a rotary ball race carried by the shaft and located within the stationary ball race, balls between the rotary and stationary races, the races extending laterally beyond the balls at each side, a guard plate clamped between the casing and the stationary race on each side of the race, said plate consisting of a flat annulus having a plurality of small holes one or more of which will be located beneath the level of the oil supply to permit a small continuous gravity feed of oil from the supply to the stationary race, the internal diameter of the annulus being such as to form an annular opening above the level of the oil for the escape of oil from the bearing axially of the shaft.

OLIVER D. H. BENTLEY.